(12) United States Patent
Brocker

(10) Patent No.: US 9,418,250 B2
(45) Date of Patent: *Aug. 16, 2016

(54) TAMPER DETECTOR WITH HARDWARE-BASED RANDOM NUMBER GENERATOR

(71) Applicant: FREESCALE SEMICONDUCTOR, INC., Austin, TX (US)

(72) Inventor: Matthew W. Brocker, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/338,972

(22) Filed: Jul. 23, 2014

(65) Prior Publication Data

US 2016/0026829 A1    Jan. 28, 2016

(51) Int. Cl.
*G06F 21/87* (2013.01)
*G06F 7/58* (2006.01)

(52) U.S. Cl.
CPC . *G06F 21/87* (2013.01); *G06F 7/58* (2013.01)

(58) Field of Classification Search
CPC ......... G06F 21/87; G06F 7/588; G06F 21/86; G06F 21/70; G06F 7/582; G06F 7/58; G06F 21/82; G06F 2200/1633
USPC .......................................................... 726/34
See application file for complete search history.

(56) References Cited

U.S. PATENT DOCUMENTS

| 5,383,143 | A | * | 1/1995 | Crouch | ............ | G01R 31/31813 |
| | | | | | | 708/254 |
| 5,446,864 | A | | 8/1995 | Burghardt et al. | | |
| 5,457,748 | A | | 10/1995 | Bergum et al. | | |
| 6,002,501 | A | | 12/1999 | Smith et al. | | |
| 6,646,565 | B1 | * | 11/2003 | Fu | ........................... | G06F 21/86 |
| | | | | | | 340/568.7 |
| 6,883,717 | B1 | | 4/2005 | Kelley et al. | | |
| 6,946,960 | B2 | | 9/2005 | Sisson et al. | | |

(Continued)

FOREIGN PATENT DOCUMENTS

EP    1160647 B1    10/2007

OTHER PUBLICATIONS

Charvet, Xavier et al; "Improving the DPA attack using Wavelet Transform"; downloaded from http://csrc.nist.gov/groups/STM/cmvp/documents/Fips 140-3/physec/secdoc.html, (downloaded Mar. 5, 2012).

(Continued)

*Primary Examiner* — William Goodchild
(74) *Attorney, Agent, or Firm* — Charlene R. Jacobsen

(57) ABSTRACT

A system includes a tamper detector that includes a linear feedback shift register (LFSR) for generating pseudorandom coded detection signals as a function of seed values and a generator polynomial. The generator polynomial is loaded from a controller to the LFSR via software, and the seed values are directly loaded from a hardware-based random number generator to the LFSR. The tamper detector has output and input elements for connection to ends of a tamper detection circuit, wherein the detection circuit is linked with a physical closure surrounding an electronic circuit. The detection signals are applied to the output element and incoming signals are received from the tamper detection circuit at a comparator via the input element. Comparison of the incoming signals with the coded detection signals is performed to detect interference with the detection circuit in an attempt to tamper with the electronic circuit.

17 Claims, 3 Drawing Sheets

(56) References Cited

U.S. PATENT DOCUMENTS

| | | |
|---|---|---|
| 7,015,823 B1 | 3/2006 | Gillen et al. |
| 7,180,008 B2 | 2/2007 | Heitmann et al. |
| 7,953,989 B1* | 5/2011 | Hsiang ................. G06F 21/572 361/672 |
| 8,127,151 B2 | 2/2012 | Nelson et al. |
| 8,184,812 B2 | 5/2012 | Margolis et al. |
| 8,689,357 B2 | 4/2014 | Arora et al. |
| 2004/0019619 A1* | 1/2004 | Buer .................... H04L 9/0869 708/254 |
| 2004/0252053 A1 | 12/2004 | Harvey |
| 2010/0192014 A1* | 7/2010 | Mejdrich .............. G06F 11/263 714/32 |
| 2012/0106113 A1 | 5/2012 | Kirmayer |

OTHER PUBLICATIONS

Maxim; "Secure supervisor IC has active tamper detection"; EE Times, Feb. 5, 2009.

* cited by examiner

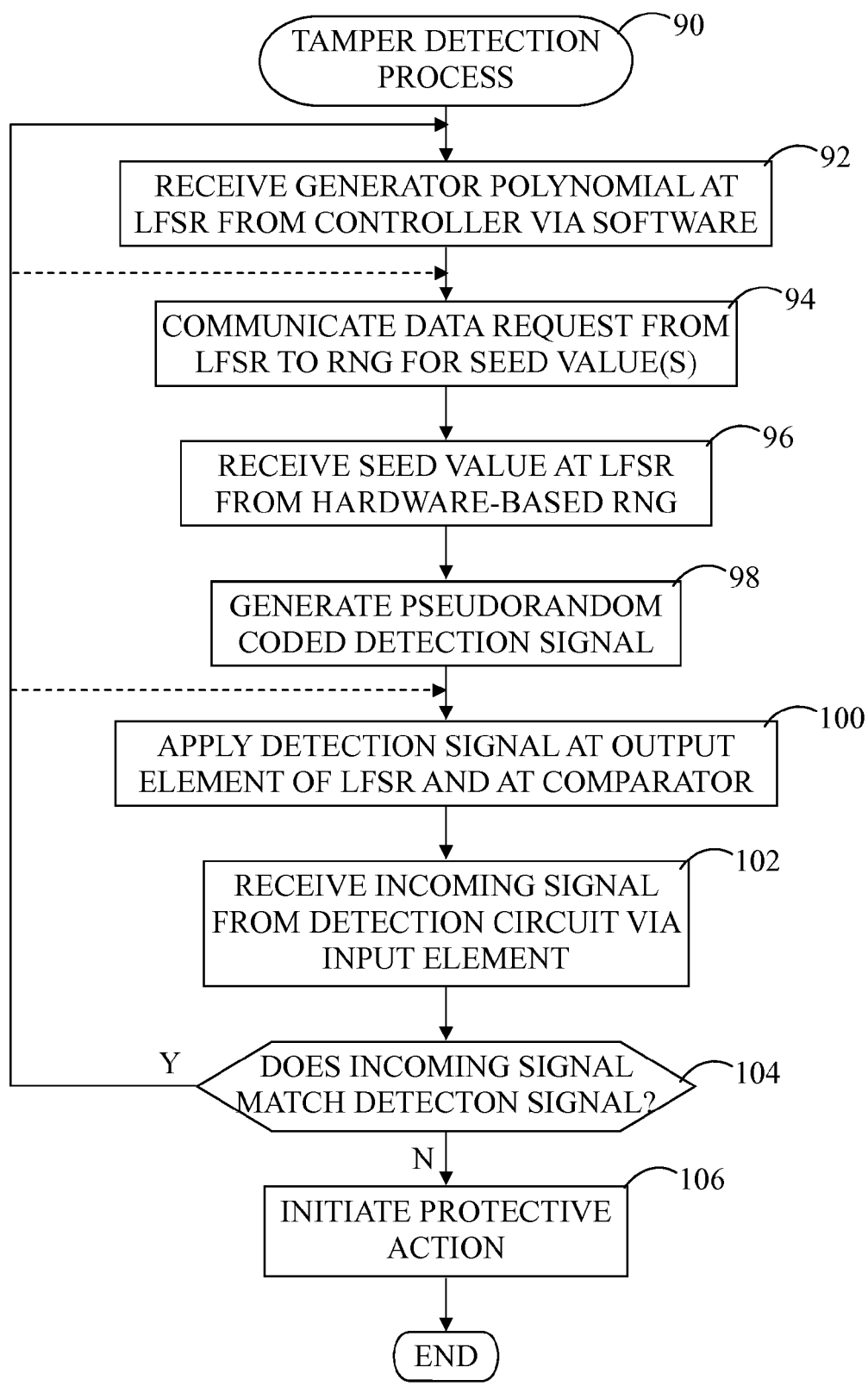

TAMPER DETECTOR WITH HARDWARE-BASED RANDOM NUMBER GENERATOR

TECHNICAL FIELD OF THE INVENTION

The present invention relates generally to electronic circuits. More specifically, the present invention relates to a tamper detection circuit for a secure electronic module.

BACKGROUND OF THE INVENTION

In many electronic applications, it is desirable or even required to protect electronic circuitry from tampering. Tampering with electronic circuitry or an electronic module involves unlawful or unauthorized access to the module with the intention of retrieving, altering, or adulterating sensitive information in a product, a package, or a system. The product, package, or system may be a point of sale terminal, a payment terminal or cash dispenser for use with bank cards, an authentication terminal for use with smart cards containing identity data and other personal information, a cryptographic module, and so forth. Security countermeasures against tampering involve secured physical features (such as a closure or casing) that make unauthorized access to a protected object or protected electronic module more difficult.

The detection of tampering can entail detection of an attack on these secured physical features. For example, the security of the electronic module may include a tamper detector for detecting interference with one or more detection circuits that secure access to the physical features. A detection circuit may include electrical conductors whose continuity is interrupted by tampering. Alternatively, the electrical detection circuit may have switches that are designed to open or close if the secured physical feature (e.g., closure) is opened or otherwise breached. By way of example, a detection signal may be applied via an output element of the tamper detector to one end of a detection circuit of the physical security feature. An incoming signal can be received at an input element of the tamper detector from the other end of the detection circuit. The tamper detector can compare the original detection signal with the incoming signal in order to detect interference with the detection circuit. However, continuous improvements are needed for circumventing attempted attacks on secured electronic modules.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

FIG. 3 shows a flowchart of a tamper detection process in accordance with another embodiment.

DETAILED DESCRIPTION

Some sophisticated attacks on secured physical features of an electronic module may attempt to neutralize the tamper detection capability. To complicate such an attack, a tamper detector may implement a linear feedback shift register (LFSR) which takes a generator polynomial and a random initial seed value and generates a pseudorandom coded signal which can be used as a detection signal in order to detect a tamper event. This pseudorandom coded signal is a deterministic code that can be difficult to predict without knowing or discovering the algorithm used to generate the code and the initial seed.

Both the generator polynomial and random seed used to generate the pseudorandom coded signal can be loaded into an LFSR seed register via software for use by the LFSR. Accordingly, if a hacker becomes aware of a particular implementation of the LFSR, then the pseudorandom coded detection signal could become predictable by the hacker, thus compromising the security of the electronic module. Accordingly, a more secure technique for generating the pseudorandom coded detection signal for tamper detection is needed.

Embodiments of the invention entail a secure system and a method for tamper detection of the secured system. More particularly, embodiments implement a tamper detector having a linear feedback shift register (LFSR) that generates pseudorandom coded detection signals as a function of initial seed values and generator polynomials. The generator polynomials may be loaded into the LFSR via software. A hardware-based random number generator generates the initial random seed values and the initial random seed values are directly loaded to the LFSR from the hardware-based random number generator. Thus, the random seed values are loaded to the LFSR without software interaction and without being software visible. Accordingly, even if someone attempting to subvert the security of the secure system for malicious intent (referred to herein as an attacker) is aware of the implementation of the LFSR, the attacker would still be unable to detect/read the random seed value. Without knowledge of the random seed values, an attacker would not be able to predict the pseudorandom coded detection signals generated by the LFSR that are used by the tamper detection logic.

Figure 1:
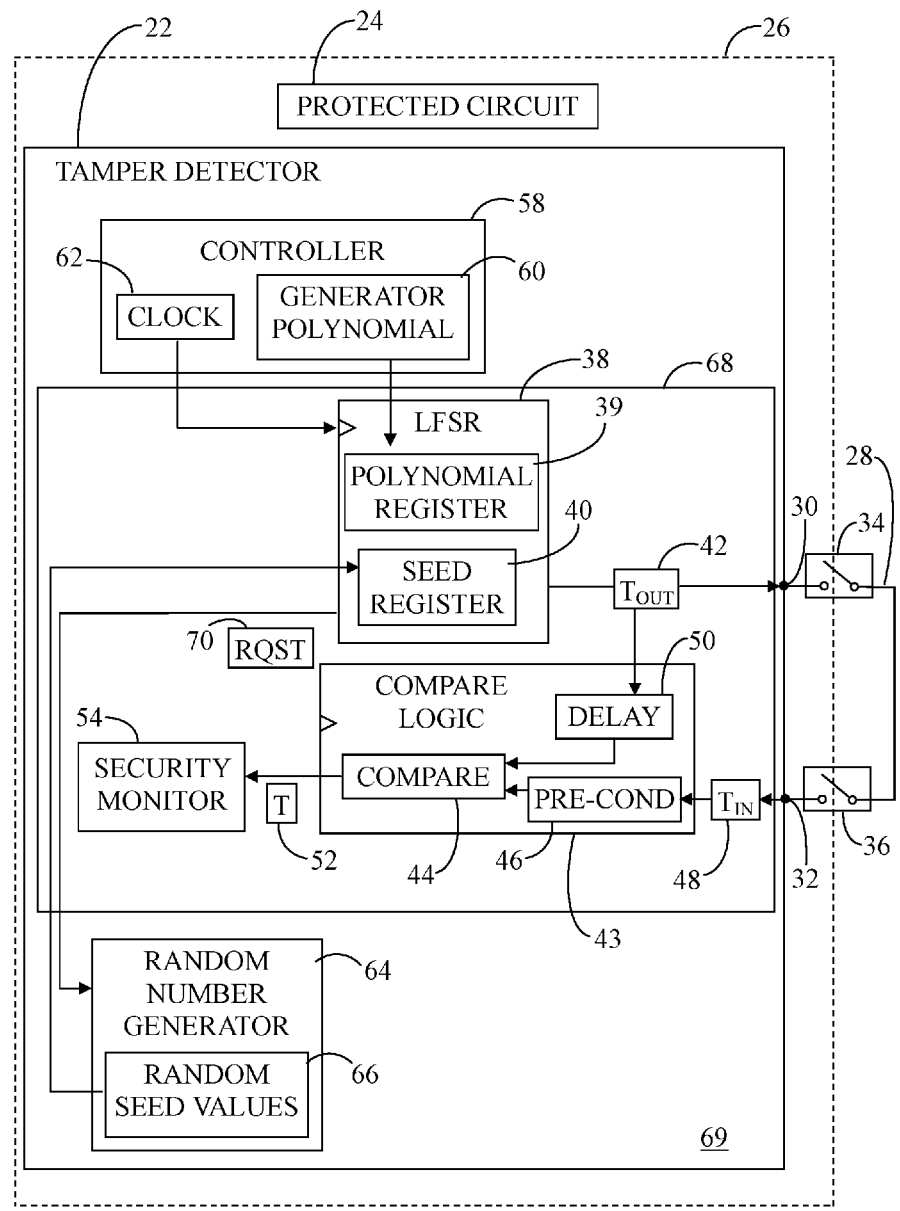
FIG. 1 shows a schematic block diagram of a secure module having a tamper detector and a circuit that is protected against unauthorized access in accordance with an embodiment.

FIG. 1 shows a schematic block diagram of a secure system 20 having a tamper detector 22 and an electronic circuit 24 that is protected against unauthorized access in accordance with an embodiment. The physical protection of electronic circuit 24 includes a physical closure 26 surrounding the protected electronic circuit 24 and a detection circuit 28 linked with physical closure 26. Electronic circuit 24 may be all or a portion of a point of sale terminal, a payment terminal or cash dispenser for use with bank cards, an authentication terminal for use with smart cards containing identity data and other personal information, a cryptographic module, or any other integrated circuit chip, product, package, or system that requires a high level of security.

Physical closure 26 may include a plurality of conductors, wiremesh, a tamper-sensitive grid, serpentine security traces, tamper barrier, and the like. Any of these features that can make up physical closure 26 can continuously conduct current and carry a detection signal provided by tamper detector 22. Any physical tampering with physical closure 26 can create a short circuit or a circuit break in physical closure 26. Tamper detector 22 monitors the circuit paths for any short circuits and/or circuit breaks created when separate conductive paths contact one another. When tamper detector 22 detects a breach in physical closure 26, i.e., a tamper event, some action can be taken by tamper detector 22, such as zeroing encryption keys, deleting data, and so forth.

In the illustrated example, one end of detection circuit 28 is connected to an output element 30 of tamper detector 22 and the other end of detection circuit 28 is connected to an input element 32 of tamper detector 22. Detection circuit 28 is shown including detection switches 34 and 36 in series, which may normally be closed but are then opened in case of interference with physical closure 26. In alternative embodiments, detection circuit 28 may include electrical conductors, in lieu of detection switches 34 and 36, whose continuity may be interrupted in case of interference. Detection switches 34 and 36 can be protected from access by physical closure 26. For example, detection switches 34 and 36 may be embedded in the material of physical closure 26. Although a single detection circuit 28 is shown for simplicity, in practice secure system 20 may include more than one detection circuit 28 connected to respective pairs of output elements 30 and input elements 32 of tamper detector 22.

Tamper detector 22 includes a linear feedback shift register (LFSR) 38 having a polynomial register 39 and a seed register 40 associated with it. LFSR 38 generates pseudorandom coded detection signals 42 ($T_{OUT}$) that are applied to output element 30. Tamper detector 22 further includes compare logic 43. Compare logic 43 includes a comparator 44 (COMPARE) having an input connected to input element 32 through a signal pre-conditioner 46 (PRE-COND). Signal pre-conditioner 46 can include a digital filter that blocks incoming signals 48 ($T_{IN}$) for a programmed number of clock cycles until they are stable so as to filter glitches in incoming signals 48. Another input of comparator 44 receives detection signals 42 from LFSR 38 through a delay circuit 50 (DELAY). Delay circuit 50 can delay detection signals 42 (for example, by one cycle of the internal clock signals) to synchronize detection signals 42 with incoming signals 48 received from detection circuit 28 by way of signal pre-conditioner 46.

Comparator 44 compares detection signals 42 ($T_{OUT}$) with incoming signals 48 ($T_{IN}$) received from detection circuit 28 and asserts a tamper signal 52 if a significant difference is detected. Tamper signal 52 is communicated to a security monitor 54 in tamper detector 22. When comparator 44 asserts tamper signal 52, security monitor 54 can take suitable protective action, such as stopping the production of detection signals 42 to prevent an attacker from camouflaging his attack by connecting output element 30 to input element 32 and/or by removing sensitive data such as codes or encryption keys from memory before the attacker has gained access to them.

In accordance with an embodiment, tamper detector 22 includes a controller 58 in communication with LFSR 38. Controller 58 is configured to control and vary a generator polynomial 60, and communicate generator polynomial 60 to polynomial register 39 of LFSR 38. Generator polynomial 60 can be included in a database of polynomials; loaded from memory associated with controller 58; communicated to polynomial register 39 as part of a boot process from read-only-memory (ROM); and so forth. Additionally, LFSR 38 may be timed by clock signals 62 that may also be controlled and varied by controller 58. Tamper detector 22 further includes a random number generator 64 in communication with LFSR 38. Random number generator 64 is configured to generate random seed values 66, and communicate random seed values 66 to seed register 40 of LFSR 38.

At least some of the processing capabilities of tamper detector 22 (e.g., LFSR 38, compare logic 43, and security monitor 54) may reside in, for example, a memory element 68 as one or more blocks or modules of program logic. These processing capabilities are accessed from memory element 68 and are executed in order to provide tamper detection within secure system 20. In contrast, however, random number generator 64 is a hardware-based circuit, i.e., a physical device, configured to generate a sequence of numbers or symbols that seemingly lack any pattern. Random number generator 64 resides outside of, or separate from, the program logic stored in memory element 68. In some embodiments, memory element 68 containing the program logic, controller 58, and random number generator 64 may be co-located on a common integrated circuit chip 69. However, other embodiments may implement different configurations. For example, memory element 68 and random number generator 64 may not be co-located on chip 69, but may instead reside on separate integrated circuit chips.

In accordance with a particular embodiment, generator polynomial 60 is loaded into polynomial register 39 associated with LFSR 38 from controller 58 via software. However, random seed values 66 are directly loaded from hardware-based random number generator 64 into seed register 40 associated with LFSR 38. Random seed values 66 may be loaded into seed register 40 in response to a data request 70 from LFSR 38. By way of example, a handshake protocol may be performed between LFSR 38 and random number generator 64. LFSR 38 can determine when to reseed seed register 40 (i.e., input a random seed value 66 into seed register 40) and LFSR 38 can then send data request 70 to random number generator 64. In response, random number generator 64 can generate and deliver random seed value 66 via, for example, a side band signal to seed register 40.

In this manner, controller 58 varies generator polynomials 60 and communicates those generator polynomials 60 to polynomial registers 39, and random number generator 64 generates random seed values 66 and communicates those random seed values 66 via a separate communication pathway to seed register 40. LFSR 38 then generates pseudorandom coded detection signals 42 ($T_{OUT}$) as a function of seed values 66 and generator polynomials 60.

Tamper detector 22 is shown with a single LFSR 38, output element 30, input element 32, and detection circuit 28 for simplicity. It should be understood, however, that secure system 20 may include a set of detection circuits 28 with corresponding sets of tamper detection elements in alternative embodiments. In still other embodiments, tamper detector 22 may include a single LFSR 38 that is interconnected with multiple input and output elements and corresponding detection circuits 28 and comparators 44 (see FIG. 1). This allows for one LFSR 38 to generate pseudorandom coded detection signals 42 for any of the multiple comparators 44, thereby reducing the complexity of tamper detector 22.

Figure 2:
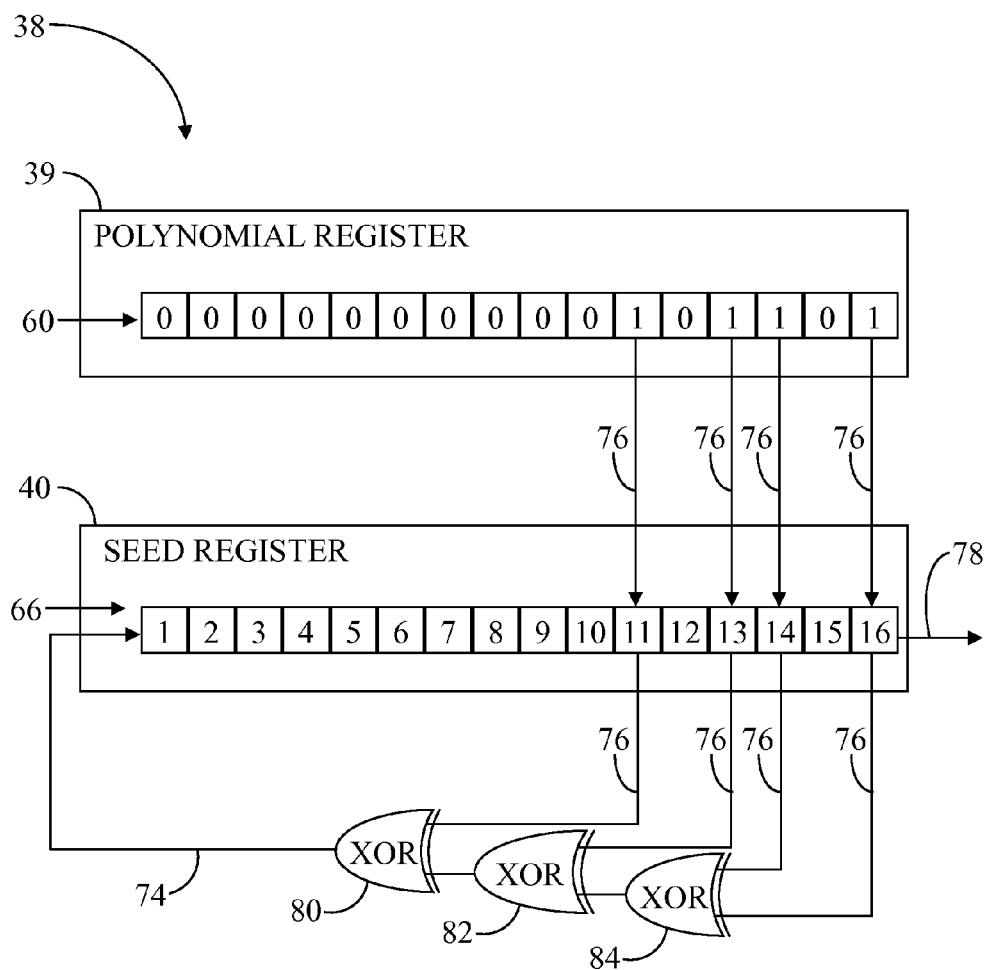
FIG. 2 shows a schematic diagram of an exemplary linear feedback shift register.

FIG. 2 shows a schematic diagram of an exemplary LFSR 38 that implements polynomial register 39 and seed register 40. In this example, seed register 40 has a set of sixteen series connected flip-flops (numbered 1 to 16 in the drawing), also referred to as bits. The input of each flip-flop (except the first flip-flop) is connected to the output of the preceding flip-flop. The state of each flip-flop except the first changes to a value defined by the output of the preceding flip-flop in response to clock signals. The input of the first flip-flop "1" is connected to a linear feedback loop 74, the feedback signal being a linear function of signals from taps 76 at outputs of flip-flops of LFSR 38, including the last flip-flop "16."

Per convention, the bit positions that affect the next state are called taps. In this example, taps 76 are flip-flops (or bits) 11, 13, 14, and 16 of generator polynomial 60 in polynomial register 39. The rightmost flip-flop or bit "16" of seed register 40 is called the output bit. Taps 76 can be exclusive OR'd (i.e., XOR'd) sequentially with the output bit and then fed back into the leftmost flip-flop. The sequence of bits in the rightmost position is referred to as an output stream 78. This output stream 78 corresponds to detection signal 42 (FIG. 1) output via output element 30 (FIG. 1).

In an embodiment, the feedback tap signals from taps 76 are governed by generator polynomial 60 provided by controller 58 (see FIG. 1) via software to polynomial register 39. Generator polynomial 60 (also referred to as a feedback polynomial or characteristic polynomial) may be chosen, controlled, and/or varied by the producer of secure system 20. An exemplary generator polynomial 60 is represented in FIG. 2 by sixteen bits. Taps 76 are based on generator polynomial 60 and define the connection of outputs of one or more flip-flops into exclusive OR (XOR) gates 80, 82, 84 in order to determine the input to another flip-flop. In this example, generator polynomial 60 is $x^{16}+x^{14}+x^{13}+x^{11}+1$, where $x^{16}, x^{14}, x^{13}, x^{11}$ correspond to taps 76. The "one" in generator polynomial 60 does not correspond to one of taps 76. Instead, the "one" corresponds to the input to the first flip-flop (i.e., $x^0$, which is equivalent to 1). The powers of the terms represent the tapped flip-flops (e.g., taps 76), counting from the left. The first and last bits are always connected as an input and output tap respectively.

Output stream 78 from the output of the last flip-flop 16 of LFSR 38 is deterministic, that is to say that each state of LFSR 38 is determined by its previous state and by random seed value 66, which is the initial value in seed register 40 for LFSR 38. LFSR 38 has a finite number of possible states before repeating a cycle of successive states. The positions of the four taps 76 shown at the outputs of flip-flops 11, 13, 14 and 16 of generator polynomial 60 give a maximum-length sequence of outputs, in this example 65,536, before repeating itself.

LFSR 38 is specified entirely by generator polynomial 60. However, the initial state, or starting bit sequence, of LFSR 38 cannot be zero since every shift of a zeroed LFSR shift register will leave it as zero. Accordingly, LFSR 38 must be initialized, i.e., seeded, to a nonzero value. Random seed value 66 directly loaded to seed register 40 from random number generator 64 (see FIG. 1) provides the initial state or starting bit sequence for LFSR 38. Random number generator 64 can vary random seed values 66 so that each of random seed values 66 is uncorrelated with previous seed values. By using hardware-based random number generator 64 to generate varying random seed values 66, these random seed values 66 can be directly loaded into seed register 40 without software interaction and without being software visible. Therefore, even if generator polynomial 60 is discovered, an attacker would be unable to predict the random patterns within pseudorandom coded detection signal 42 because the attacker is unaware of the initial state of LFSR 38 set by random seed values 66.

It should be understood that that LFSR 38 need not be limited to the sixteen bit Fibonacci LFSR described herein. In alternative embodiments, LFSR 38 may include more than or fewer than sixteen bits in a Fibonacci implementation. Alternatively, LFSR 38 may be a Galois implementation of any suitable length in which the gates are placed between the registers, or bits. Still other alternative embodiments may implement other LFSR configurations as long as the random seed values are provided by a hardware-based random number generator and loaded to the LFSR without software interaction and without being software visible.

Referring now to FIGS. 1 and 3, FIG. 3 shows a flowchart of a tamper detection process 90 in accordance with another embodiment. Tamper detection process 90 can be performed by executing the application programs of tamper detector 22 within secure system 20.

In accordance with process 90, generator polynomial 60 is received (92) at LFSR 38 from controller 58 via software. Upon its receipt, generator polynomial 60 may be written into, or otherwise stored in, polynomial register 39. LFSR 38 communicates (94) data request 70 to hardware-based random number generator 64 requesting one or more random seed values 66. In response, one or more random seed values 66 are received (96) at LFSR 38 directly from random number generator 64 which can be loaded into seed register 40.

LFSR 38 accesses seed register 40 to obtain generator polynomial 60 and a random seed value 66. LFSR generates (98) pseudorandom coded detection signal 42 as a function of random seed value 66 and generator polynomial 60. Pseudorandom coded detection signal 42 is applied (100) at output element 30 and at comparator 44. Incoming signals 48 are received (102) from detection circuit 28 via input element 32. Comparator 44 compares a suitably pre-conditioned incoming signal 48 with detection signal 42 to determine whether they match (104). When incoming signal 48 matches detection signal 42, a determination is made that physical closure 26 has not been tampered with or otherwise attacked.

When a determination is made at step 104 that no tampering has occurred, process control may loop back to steps 92, 94, 96, 98 to optionally receive another generator polynomial 60, request and receive another random seed value 66, and generate another pseudorandom coded detection signal 42 that may be applied to output element 100. It should be understood, that there is no requirement to receive another generator polynomial 60. For example, process control may instead loop back to step 94 (as denoted by a dashed line preceding step 94) to request and receive another random seed value 66 without changing generator polynomial 60. Alternatively, process control may instead loop back to step 100 (as denoted by another dashed line preceding step 100) where the next pseudorandom coded detection signal 42 is outputted. By way of example, a "next" pseudorandom coded detection signal 42 may be produced for each pulse of clock 62. A sixteen bit generator polynomial 60 will produce 65,536 ($2^{16}$) random outputs before it starts duplicating them. At the point where duplication is to begin, process control may loop back step 94 to request and receive another random seed value 66.

When incoming signal 48 does not match (i.e., significantly differs from) detection signal 42, a conclusion can be inferred that interference is detected via detection circuit 28 thereby indicating that tampering has indeed occurred. Accordingly, when incoming signal 48 does not match detection signal 42 at step 104, protective action is initiated (106) to prevent unauthorized access to protected circuit 24. By way of example, comparator 44 may assert tamper signal 52, which is communicated to security monitor 54. Security monitor 54 can take suitable protective action such as deleting sensitive data from memory, deleting or zeroing encryption keys, and so forth before the attacker has gained access to them. Thereafter, tamper detection process 90 may end.

A secure system and a method for tamper detection of the secured system are provided. More particularly, embodiments implement a tamper detector having a linear feedback shift register (LFSR) that generates pseudorandom coded detection signals as a function of initial seed values and generator polynomials. The generator polynomials may be loaded into a polynomial register associated with the LFSR via software. A hardware-based random number generator generates the initial random seed values and the initial random seed values are directly loaded to a seed register associated with the LFSR from the hardware-based random number generator. Thus, the random seed values are loaded to the LFSR seed register without software interaction and without being software visible. Accordingly, even if an attacker is aware of the implementation of the LFSR, including the generator polynomial, the attacker would still be unable to detect/read the random seed value. Without knowledge of the random seed values, an attacker would not be able to predict the pseudorandom coded detection signals generated by the LFSR that are used by the detection logic.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless stated otherwise, the connections may be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Similarly, any arrangement of components to achieve the same functionality is effectively "associated" such that the desired functionality is achieved. Hence, any two components combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Multiple operations described above may be combined into a single operation, a single operation may be distributed in additional operations, and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

In the claims, the word "comprising" or "having" does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

What is claimed is:

1. A system comprising:
    a linear feedback shift register (LFSR) configured to generate pseudorandom coded signals as a function of seed values and a generator polynomial, said pseudorandom coded signals being detection signals;
    a controller in communication with said LFSR for providing said generator polynomial;
    a random number generator in communication with said LFSR for providing said seed values,
    an output element in communication with said LFSR, wherein said detection signals are applied to said output element;
    an input element, said output and input elements being configured for connection to respective ends of a detection circuit; and
    a comparator in communication with each of said LFSR and said input element, wherein said detection signals are applied to said comparator from said LFSR, incoming signals are received at said comparator from said detection circuit by way of said input element, said comparator compares said incoming signals with said detection signals received from said LFSR to detect interference with said detection circuit, and said comparator asserts a tamper signal if said incoming signals differ from said detection signals.

2. The system of claim 1 wherein said seed values are directly loaded to said LFSR from said random number generator.

3. The system of claim 2 wherein said generator polynomial is loaded to said LFSR from said controller via software.

4. The system of claim 1 wherein said random number generator comprises a hardware-based random number generator.

5. The system of claim 1 wherein said random number generator provides said seed values in response to a data request from said LFSR.

6. The system of claim 1 further comprising:
    an electronic circuit; and
    a physical closure surrounding said electronic circuit, wherein said detection circuit is linked with said physical closure and detection of said interference with said detection circuit indicates an attempt to tamper with said electronic circuit.

7. The system of claim 1 wherein said LFSR resides in a memory element as a logic module, and said random number generator resides outside of said memory element.

8. The system of claim 1 wherein said LFSR and said random number generator are co-located on a common integrated circuit chip.

9. The system of claim 1 wherein said LFSR and said random number generator are located on different integrated circuit chips.

10. A method comprising:
receiving, at a linear feedback shift register (LFSR), a generator polynomial from a controller via software;
receiving, at said LFSR, seed values from a hardware-based random number generator;
generating, at said LFSR, pseudorandom coded signals as a function of said seed values and said generator polynomial, said pseudorandom coded signals being detection signals;
applying said detection signals to an output element in communication with said LFSR;
applying said detection signals to a comparator in communication with said LFSR:
receiving incoming signals at said comparator from a detection circuit by way of an input element, wherein said output and input elements are connected to respective ends of said detection circuit;
comparing said incoming signals with said detection signals at said comparator to detect interference with said detection circuit; and
asserting a tamper signal from said comparator if said incoming signals differ from said detection signals.

11. The method of claim 10 further comprising communicating a data request from said LFSR to said hardware-based random number generator, wherein said hardware-based random number generator provides said seed values in response to said data request for receipt at said LFSR.

12. The method of claim 10 wherein a system includes an electronic circuit and a physical closure surrounding said electronic circuit, said detection circuit is linked with said physical closure, and said method further comprises initiating a protective action to prevent unauthorized access to said electronic circuit in response to said tamper signal when said interference is detected.

13. A system comprising:
a memory element;
a linear feedback shift register (LFSR) residing in said memory element as a logic module, said LFSR being configured to generate pseudorandom coded signals as a function of seed values and a generator polynomial, wherein said pseudorandom coded signals are detection signals;
a controller in communication with said LFSR for providing said generator polynomial;
a hardware-based random number generator in communication with said LFSR for providing said seed values, said hardware-based random number generator residing outside of said memory element;
an output element in communication with said LFSR, wherein said detection signals are applied to said output element;
an input element, said output and input elements being configured for connection to respective ends of a detection circuit; and
a comparator in communication with each of said LFSR and said input element, wherein said detection signals are applied to said comparator from said LFSR, incoming signals are received by said comparator from said detection circuit by way of said input element, said comparator compares said incoming signals with said detection signals received from said LFSR to detect interference with said detection circuit, and said comparator asserts a tamper signal if said incoming signals differ from said detection signals.

14. The system of claim 13 wherein:
said generator polynomial is loaded to said LFSR from said controller via software; and
said seed values are directly loaded to said LFSR from said hardware-based random number generator.

15. The system of claim 13 wherein said hardware-based random number generator provides said seed values in response to a data request from said LFSR.

16. The system of claim 13 further comprising:
an electronic circuit; and
a physical closure surrounding said electronic circuit, wherein said detection circuit is linked with said physical closure and detection of said interference with said detection circuit indicates an attempt to tamper with said electronic circuit.

17. The system of claim 13 wherein said memory element and said random number generator are co-located on a common integrated circuit chip.

* * * * *